June 1, 1926.

S. HISANOSUKE

ANTISKID DEVICE

Filed Oct. 12, 1925

1,587,313

WITNESSES
E. A. Wilson
Franklin J. Foster

INVENTOR
SATO HISANOSUKE
BY Munn Co
ATTORNEYS

Patented June 1, 1926.

1,587,313

UNITED STATES PATENT OFFICE.

SATO HISANOSUKE, OF NEW YORK, N. Y.

ANTISKID DEVICE.

Application filed October 12, 1925. Serial No. 62,162.

The antiskid device of the present invention is in the nature of a chain for automobile shoes.

An object of the invention is to provide a device of this character of simple, practical construction which will permit ready removal or replacement of worn tread members, which will permit the ready attachment of a chain to a shoe, and which will insure against accidental loss of a chain.

Preferably the tread members are in the nature of transversely bendable, longitudinally expansible resilient members which tend to exert an outward pull on the two chains which connect them, and to offset such outward pull, I provide relatively strong contractile springs which connect the links of each chain at intervals.

With the above noted and other objects in view the invention consists in certain novel features of construction and combinations and arrangements of parts, as will be more fully hereinafter set forth and pointed out in the claims. The invention may be more fully understood from the following description in connection with the accompanying drawings, wherein—

Figure 1:
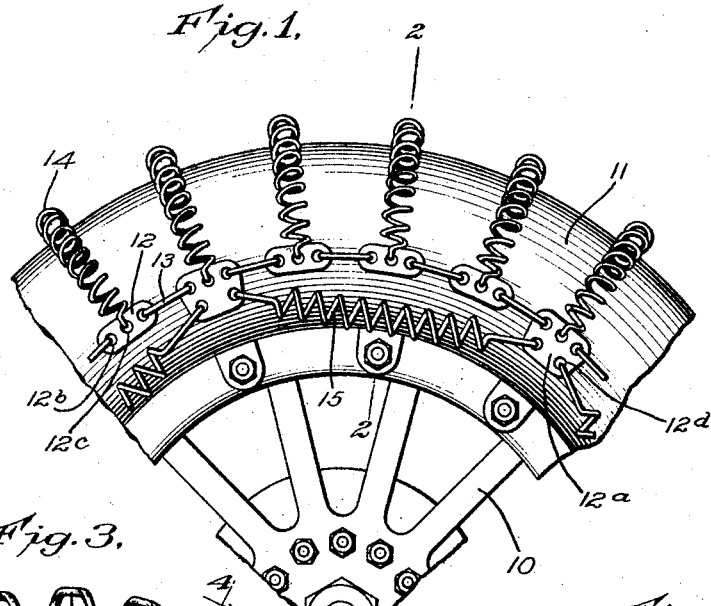
Fig. 1 is a fragmentary view in side elevation of a vehicle wheel with my improved antiskid chain in applied position.

Reference character 10 designates a vehicle wheel provided with the usual tire shoe 11. The anti-skid device of the present invention includes a pair of annular chains formed of alternate plates 12 and wire links 13. The cross tread members 14 are anchored at their ends in the plates. At spaced intervals about the chains, I provide relatively large plates $12^a$, said plates being connected by contractile springs 15.

It will be noted that the plates 12 and $12^a$ consist of flat metallic members having holes $12^b$ in their ends to accommodate the hooked ends of the wire links 13, and with openings $12^c$ near their centers in which the hooked ends $14^a$ of the tread members 14 are detachably anchored.

In the form of the invention shown in Fig. 1, the tread members 14 are in the nature of coiled contractile springs. Such springs offer a very efficient tread surface, but if they are placed under any great tension, some means must be provided for counteracting their outward pull on the annular chains. Such outward pull is effectively offset by the use of the contractile springs 15, preferably larger and stronger than the tread springs 14, and having their ends anchored in openings $12^d$ in the plates $12^a$. For removing the chain from a shoe, I preferably loosely connect one end of one of the springs 15 and one of the links 13 with a plate $12^a$ of each annular chain, whereby the links and springs may be quickly disconnected from the plate to open the annular chains and permit removal of the antiskid device. It will of course be obvious that the usual type of chain connecting devices might be utilized at any suitable point in the annular chains instead of merely detachably connecting one pair of plates $12^a$ with their associated springs and links.

While I have shown the springs 15 attached to both annular chains I may elect to use them on one of the chains.

Figure 3:
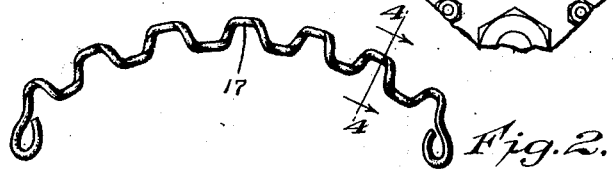
Fig. 3 is a detail view in side elevation of a modified form of tread member.
Figure 4:
Fig. 4 is a view in transverse section on the line 4—4 of Fig. 3.
Figure 2:
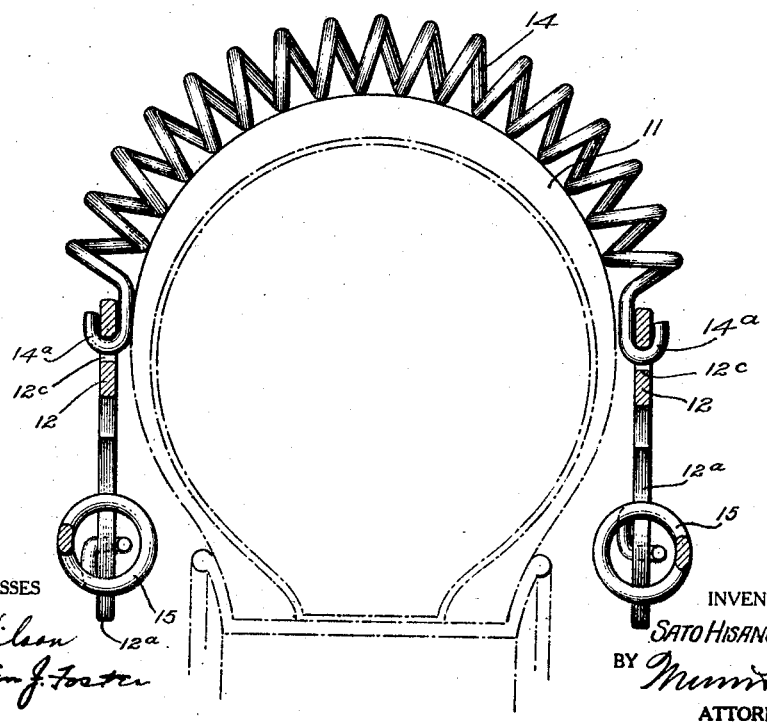
Fig. 2 is an enlarged transverse sectional view on the line 2—2 of Fig. 1.

In Figures 3 and 4 I have illustrated a modified type of cross tread member which will do away with the necessity of using the contractile springs 15. This tread member indicated at 17 is also in the general nature of a coil spring, but is extremely stiff so that it normally assumes the arcuate shape shown in Fig. 3. The convolutions are flattened to provide wider tread surfaces. The spring will be slightly flexed and extended in applied position, and the convolutions will be slightly compressible as they are jammed between the vehcile and the surface over which the vehicle is rolling. The principal advantage of this type of tread over the type shown in Figures 1 and 2, is the fact that it provides a resilient action and an efficient ground gripping surface without requiring the use of contractile springs such as 15 to relieve the chain in the links of the annular chains. In the foregoing description it will be seen that I have provided an antiskid device which may be readily removable, readily applied to a vehicle wheel, and which will permit of the ready removal and replacement of worn or broken cross treads.

While the embodiment of the invention illustrated is a preferred one, it will be evident that various changes and alterations might be made in the general form and arrangement of parts described, without departing from the invention. Hence I do not wish to limit myself to the details set forth, but shall consider myself at liberty to make such changes and alterations as fairly fall within the spirit and scope of the appended claims.

I claim—

1. An antiskid device including a pair of annular chains adapted to lie on opposite sides of a tire shoe, and contractile spring tread elements connecting the chains, said chains including alternate links and plates, said plates having openings therein into which the ends of the tread elements are hooked, certain of said plates projecting inwardly beyond the others, and coiled contractile springs having their ends hooked in openings in the inwardly projecting plates.

2. As a new element in an antiskid chain, a tread member comprising a coiled contractile spring having flattened convolutions.

3. As a new element in an antiskid chain, a tread member comprising a normally arcuate length of relatively stiff coiled spring bendable transversely and extensible longitudinally the convolutions of said spring being flattened to provide relatively wider tread surfaces.

SATO HISANOSUKE.